(12) United States Patent
Tokashiki

(10) Patent No.: US 8,918,284 B2
(45) Date of Patent: Dec. 23, 2014

(54) INFORMATION PROCESSING APPARATUS, BEHAVIOR PREDICTION DISPLAY METHOD, AND COMPUTER PROGRAM THEREFOR

(75) Inventor: Mamoru Tokashiki, Tokyo (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 13/053,628

(22) Filed: Mar. 22, 2011

(65) Prior Publication Data

US 2011/0246059 A1    Oct. 6, 2011

(30) Foreign Application Priority Data

Mar. 31, 2010   (JP) ................................. 2010-082337

(51) Int. Cl.
  G01C 21/00    (2006.01)
  G09G 5/00     (2006.01)
  G01S 19/39    (2010.01)
  G01C 21/34    (2006.01)

(52) U.S. Cl.
  CPC ............. *G01S 19/39* (2013.01); *G01C 21/3484* (2013.01)
  USPC ............ 701/533; 345/619; 701/538; 701/424

(58) Field of Classification Search
  CPC ........................... G01S 19/39; G01C 21/3484
  USPC ......................... 701/424, 533, 538; 345/619
  See application file for complete search history.

(56) References Cited

U.S. PATENT DOCUMENTS

| | | | |
|---|---|---|---|
| 8,237,744 B2* | 8/2012 | Joachim et al. | 345/660 |
| 8,718,925 B2* | 5/2014 | Letchner et al. | 701/410 |
| 8,725,326 B2* | 5/2014 | Kapp et al. | 701/20 |
| 2002/0087262 A1* | 7/2002 | Bullock et al. | 701/202 |
| 2005/0125147 A1* | 6/2005 | Mueller | 701/209 |
| 2005/0283311 A1* | 12/2005 | Ohler | 701/209 |
| 2006/0149461 A1* | 7/2006 | Rowley et al. | 701/202 |
| 2007/0038372 A1* | 2/2007 | Kudo et al. | 701/211 |
| 2007/0150174 A1* | 6/2007 | Seymour et al. | 701/200 |
| 2008/0027639 A1* | 1/2008 | Tryon | 701/209 |
| 2008/0120025 A1* | 5/2008 | Naitou et al. | 701/207 |

(Continued)

FOREIGN PATENT DOCUMENTS

| | | |
|---|---|---|
| JP | 2000-293540 | 10/2000 |
| WO | WO 2007/047736 A2 | 4/2007 |
| WO | WO 2009/119955 A1 | 10/2009 |

OTHER PUBLICATIONS

Cao, Y. (2007). Grid-enabled transportation routing with real-time events. George Mason University). ProQuest Dissertations and Theses, , 110. Retrieved from http://search.proquest.com/docview/304734800?accountid=14753. (304734800).*

(Continued)

*Primary Examiner* — Scott Zare
(74) *Attorney, Agent, or Firm* — Wolf, Greenfield & Sacks, P.C.

(57) ABSTRACT

A method, system, device, and computer readable medium for a displaying a predicted route of a user. It can be determined whether a predicted route is within a displayed range of the map. If the predicted route is not within the displayed range of the map, the displayed range of the map can be automatically changed such that the predicted route is within the displayed range of the map.

32 Claims, 7 Drawing Sheets

(56) References Cited

U.S. PATENT DOCUMENTS

| | | |
|---|---|---|
| 2010/0070171 A1* | 3/2010 | Barbeau et al. ............... 701/207 |
| 2011/0238289 A1* | 9/2011 | Lehmann et al. ............. 701/201 |
| 2011/0296289 A1 | 12/2011 | Tokashiki |
| 2012/0254309 A1 | 10/2012 | Tokashiki |

OTHER PUBLICATIONS

Ohm, J.R., Stereo/multiview video encoding using the MPEG family of standards. Proceedings of SPIE. Jan. 1999;3639(27):12 pgs. XP008022007.

* cited by examiner

INFORMATION PROCESSING APPARATUS, BEHAVIOR PREDICTION DISPLAY METHOD, AND COMPUTER PROGRAM THEREFOR

CROSS REFERENCE TO RELATED APPLICATIONS

This application claims priority under 35 U.S.C. §119 to Japanese Priority Patent Application JP 2010-82337, filed in the Japan Patent Office on Mar. 31, 2010, the entire content of which is hereby incorporated by reference.

BACKGROUND

1. Technical Field

The present disclosure relates to an information processing apparatus, a behavior prediction display method, and a computer program therefor.

2. Description of the Related Art

There is a technique for predicting user's behavior in the future from a present location of a mobile terminal held by the user and a behavior history of the user in the past (for example, see Japanese Patent Application Laid-Open No. 2000-293540). Prediction of a behavior is executed on a server connected to a mobile terminal through a wireless network or the mobile terminal to display behavior prediction information on the screen of the mobile terminal. A user watches the behavior prediction information displayed on the mobile terminal to make it possible to utilize the information in her/his behavior.

JP2006053132 shows an information processing apparatus that predicts a plurality of moving routes based on a behavior history, and displays each route in a form (e.g., size, color, scale) that differs from route to route according to the probability of each route.

SUMMARY

In behavior prediction, unlike in ordinary map information, route searching or navigation to a destination, a plurality of final destinations may be displayed. Furthermore, with movement of the location of a mobile terminal, predicted final destinations may change by the minute.

However, depending on the scale of a map displayed on a mobile terminal, a final destination is out of the range of the screen. In this case, a user has to perform an additional operation such as a change in scale of the map to display, on the screen, the final destination being out of the range of the screen. Therefore, the user is caused to execute the additional operation to display a result of behavior prediction.

In view of the foregoing, it is desirable to provide a novel and improved information processing apparatus, behavior prediction display method, and computer program which can display information of a final destination obtained by behavior prediction on a display without requesting a user to execute an additional operation.

Some embodiments relate to a method of displaying predicted information of a user. The method includes generating display information of a map having within a displayed range first predicted information of the user; acquiring second predicted information of the user; determining whether the second predicted information is within a displayed range of the map; and if the second predicted information is not within the displayed range of the map, automatically changing the displayed range of the map such that the second predicted information is within the displayed range of the map.

Some embodiments relate to a device that includes a display control unit that controls a display unit to display a map having within a displayed range at least one first predicted route of the user. The device also includes a processing unit that receives at least one second predicted route of the user, determines whether the at least one second predicted route is within a displayed range of the map, and, if the at least one second predicted route is not within the displayed range of the map, automatically changes the displayed range of the map such that the at least one second predicted route is within the displayed range of the map.

Some embodiments relate to a method of generating and displaying predicted information of a user. The method includes generating display information of a map having within a displayed range first predicted information of the user; generating second predicted information of the user based on a change in the user's behavior; determining whether the second predicted information is within a displayed range of the map; and if the second predicted information is not within the displayed range of the map, automatically changing the displayed range of the map such that the second predicted information is within the displayed range of the map.

Some embodiments relate to a system for generating and displaying a predicted route of a user. The system includes a mobile device having a display unit that displays a map having within a displayed range at least one first predicted route of the user, and a processing unit that receives at least one second predicted route of the user, determines whether the at least one second predicted route is within a displayed range of the map, and, if the at least one second predicted route is not within the displayed range of the map, automatically changes the displayed range of the map such that the at least one second predicted route is within the displayed range of the map. The system also includes a server that generates the at least one first and at least one second predicted routes and sends the at least one first and at least one second predicted routes to the mobile device.

Some embodiments relate to a computer readable storage medium having stored thereon instructions, which, when executed, perform a method of displaying predicted information of a user. The method includes generating display information of a map having within a displayed range at least one first predicted route of the user; receiving at least one second predicted route of the user; determining whether the at least one second predicted route is within a displayed range of the map; and if the at least one second predicted route is not within the displayed range of the map, automatically changing the displayed range of the map such that the at least one second predicted route is within the displayed range of the map.

Some embodiments relate to a method of displaying predicted routes of a user. The method includes generating display information of a map and a plurality of predicted routes, the plurality of predicted routes having been generated based on the user's behavior; and if at least one predicted route is not within the displayed range of the map, automatically changing the displayed range of the map such that the at least one predicted route is within the displayed range of the map.

Some embodiments relate to a mobile device that includes a display unit that concurrently displays a map and a plurality of predicted routes, the plurality of predicted routes having been generated based on the user's behavior.

Some embodiments relate to a method of generating and displaying predicted routes of a user. The method includes generating a plurality of predicted routes of the user based on the user's behavior; sending the plurality of predicted routes to a mobile device; concurrently displaying a map and the plurality of predicted routes using a display unit of the mobile device; and if at least one predicted route is not within the displayed range of the map, automatically changing the displayed range of the map such that the at least one predicted route is within the displayed range of the map.

Some embodiments relate to a system for generating and displaying predicted routes of a user. The system includes a mobile device comprising a display unit that generates display information of a map and a plurality of predicted routes of the user, and, if at least one predicted route is not within the displayed range of the map, automatically changes the displayed range of the map such that the at least one predicted route is within the displayed range of the map. The system also includes a server that generates the plurality of predicted routes based on the user's behavior and sends the plurality of predicted routes to the mobile device.

Some embodiments relate to a computer readable storage medium having stored thereon instructions, which, when executed, perform a method of displaying predicted routes of a user. The method includes generating display information of a map and a plurality of predicted routes, the plurality of predicted routes having been generated based on the user's behavior; and if at least one predicted route is not within the displayed range of the map, automatically changing the displayed range of the map such that the at least one predicted route is within the displayed range of the map.

DETAILED DESCRIPTION OF THE EMBODIMENT

Figure 1:
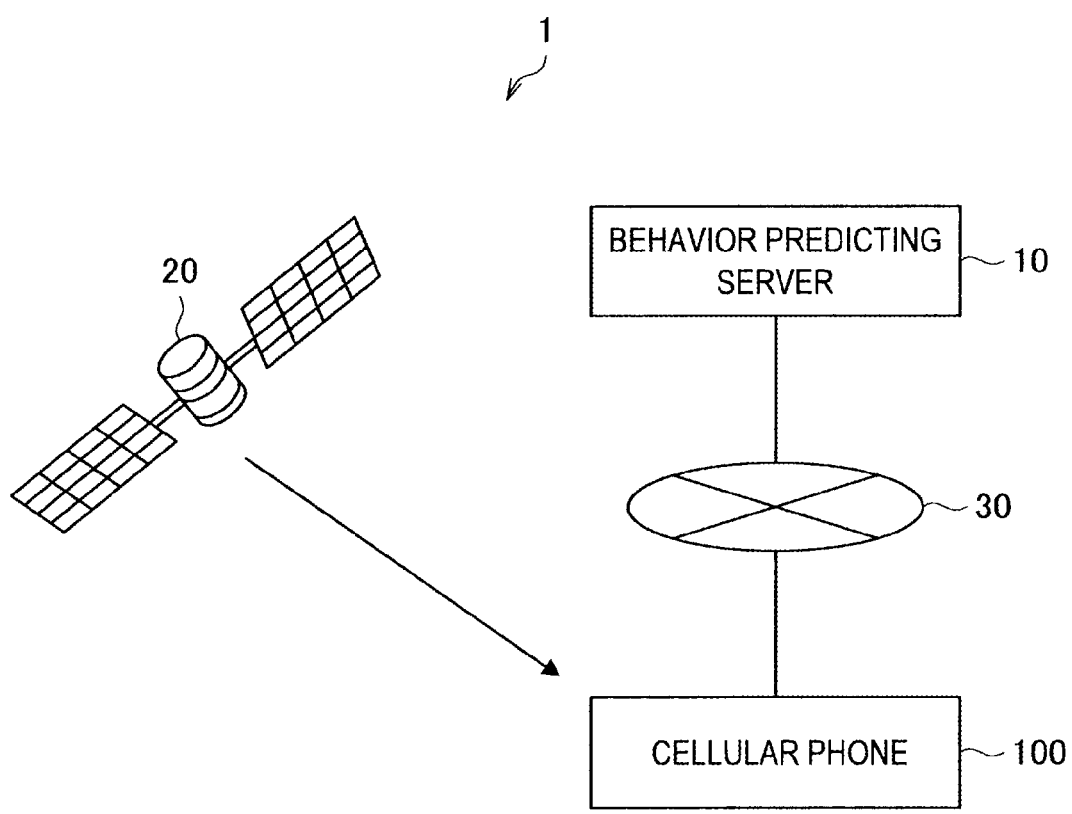
FIG. 1 is an explanatory diagram showing a configuration of a behavior prediction system 1 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An explanation is made in the following order.
<1. One Embodiment of the Present Invention>
[1-1. Configuration of Behavior Prediction System]
[1-2. Configuration of Cellular Phone]
[1-3. Configuration of Behavior Predicting Server]
[1-4. Operation of Behavior Predicting System]
[1-5. Modification]
<2. Conclusion>

1. One Embodiment of the Present Invention

[1-1. Configuration of Behavior Predicting System]

A configuration of a behavior predicting system according to an embodiment of the present invention will be described first. FIG. 1 is an explanatory diagram showing a configuration of a behavior predicting system 1 according to an embodiment of the present invention. The configuration of the behavior predicting system 1 according to an embodiment of the present invention will be described below.

As shown in FIG. 1, the behavior predicting system 1 according to an embodiment of the present invention includes a behavior predicting server 10 which predicts a behavior of a user who holds a cellular phone 100 from a present location of the cellular phone 100 and the cellular phone 100 which acquires behavior prediction information from the behavior predicting server 10 to display the behavior prediction information.

Data exchange between the behavior predicting server 10 and the cellular phone 100 is executed through a wireless network 30. The cellular phone 100 includes a receiver to acquire the present location from a GPS (Global Positioning System) satellite 20. The cellular phone 100 transmits information of the acquired present location to the behavior predicting server 10 through the wireless network 30.

The behavior predicting server 10 predicts a behavior in the future from the information of the present location of the cellular phone 100 to generate behavior prediction information and transmits the behavior prediction information to the cellular phone 100 through the wireless network 30 together with the map information. The behavior prediction information includes a start point, a destination, a route from the start point to the destination, a probability that the user of the cellular phone 100 selects the route, and expected time of arrival.

Pieces of information of the start point, the destination, and the route are expressed by latitudes and longitudes. When the behavior predicting server 10 transmits the behavior prediction information to the cellular phone 100, the cellular phone 100 can display the behavior prediction information acquired from the behavior predicting server 10 on the screen.

In the embodiment, although the behavior predicting server 10 which executes behavior prediction of the user who holds the cellular phone 100 is explained, the present invention is not limited to the example. For example, the behavior prediction of the user who holds the cellular phone 100 may be executed inside the cellular phone 100. At this time, the cellular phone 100 may acquire only map information from an external server or the like and display the map information on the screen together with the behavior prediction information.

The configuration of the behavior predicting system 1 according to an embodiment of the present invention has been described above with reference to FIG. 1. The configuration of the cellular phone 100 according to an embodiment of the present invention will be described below.

[1-2. Configuration of Cellular Phone]

Figure 2:
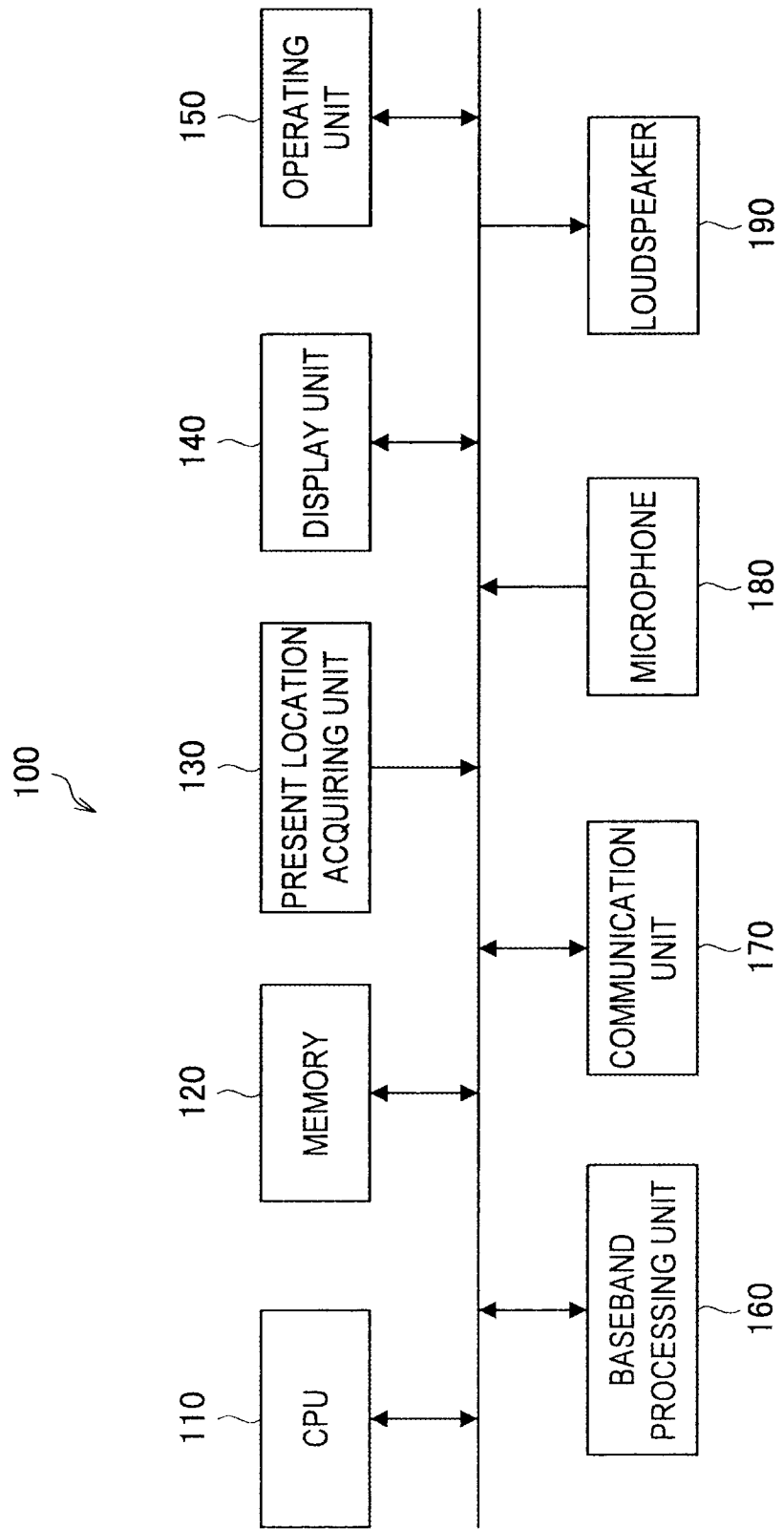
FIG. 2 is an explanatory diagram showing a functional configuration of a cellular phone 100 according to an embodiment of the present invention.

FIG. 2 is an explanatory diagram showing a functional configuration of the cellular phone 100 according to an embodiment of the present invention. The functional configuration of the cellular phone 100 according to an embodiment of the present invention will be described below with reference to FIG. 2.

As shown in FIG. 2, the cellular phone 100 according to an embodiment of the present invention includes a CPU 110, a memory 120, a present location acquiring unit 130, a display unit 140, an operation unit 150, a baseband processing unit 160, a communication unit 170, a microphone 180, and a loudspeaker 190.

The CPU 110 is to execute various operations according to a computer program stored in the memory 120. The CPU 110 controls each unit of the cellular phone 100 depending on an operation of the CPU 110. Various processing contents of the CPU 110 are displayed on the display unit 140 configured by a liquid crystal display panel or the like as needed.

The memory 120 has a role as a working area for data processing by the CPU 110 and a function as a storage medium which holds various data. The memory 120 can use a volatile memory or a nonvolatile memory. As the nonvolatile memory, for example, a flash memory, an EEPROM (Electrically Erasable Programmable Read-Only Memory), an EPROM (Erasable Programmable ROM), and the like are given.

The operation unit 150 includes a power supply button, a telephone call button, a number/character input button, and the like. When a user inputs a telephone number of an intended callee, the operation unit 150 supplies data expressed by the telephone number to the CPU 110. The CPU 110 transmits a connection request to the callee expressed by the telephone number input by the user through the communication unit 170. At this time, a wireless communication line is connected depending on a response of the callee. When the line is connected, the communication unit 170 supplies an RF signal received from the callee through an antenna (not shown) to the baseband processing unit 160 and converts the RF signal into a baseband signal here. A voice signal generated from the baseband signal generated by the baseband processing unit 160 is output as voice from the loudspeaker 190.

When a user of the cellular phone 100 inputs her/his voice through the microphone 180, an input voice signal supplied from the microphone 180 is supplied to the baseband processing unit 160. The baseband processing unit 160 converts a baseband signal into an RF signal. The baseband processing unit 160 sends the RF signal generated by the conversion to the wireless communication line through the communication unit 170 to transmit the RF signal to the callee connected to the line.

The CPU 110 transmits various pieces of information input by causing the user of the cellular phone 100 to operate the operation unit 150 to a communicatee through the baseband processing unit 160 and the communication unit 170, takes an RF signal on which the information from the communicatee is superposed through the communication unit 170 and the baseband processing unit 160, and displays the RF signal on the display unit 140.

When the series of processes are executed by the CPU 110, the user who uses the cellular phone 100 can give and receive a conversation and the various pieces of information to/from the callee.

The functional configuration of the cellular phone 100 according to an embodiment of the present invention has been described with reference to FIG. 2. A functional configuration of the CPU 110 included in the cellular phone 100 according to an embodiment of the present invention will be described below.

Figure 3:
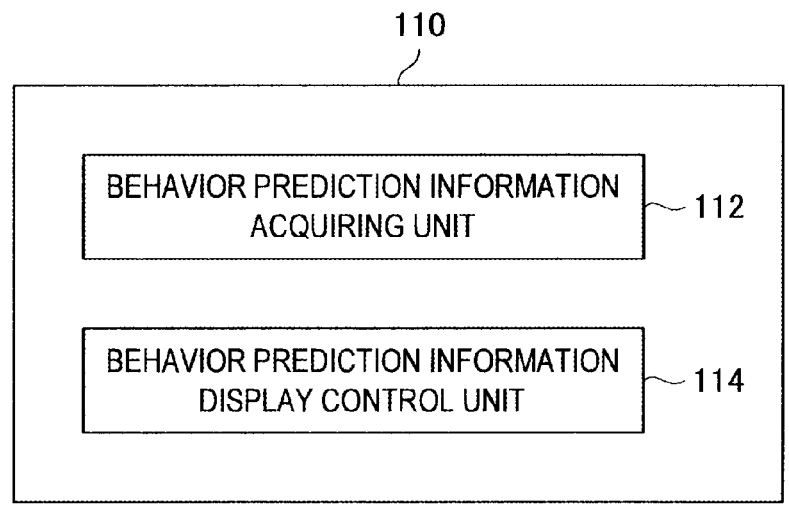
FIG. 3 is an explanatory diagram showing a functional configuration of a CPU 110 included in the cellular phone 100 according to an embodiment of the present invention.

FIG. 3 is an explanatory diagram showing the functional configuration of the CPU 110 included in the cellular phone 100 according to an embodiment of the present invention. The CPU 110 shown in FIG. 2 is configured to function as a behavior prediction information acquiring unit 112 and a behavior prediction information display control unit 114 by reading and executing a computer program stored in the memory 120.

The behavior prediction information acquiring unit 112 is to acquire behavior prediction information which is predicted by the behavior predicting server 10 from a change of the information of the present location of the cellular phone 100 acquired by the present location acquiring unit 130 and which is transmitted from the behavior predicting server 10 through the wireless network 30 as needed. The behavior prediction information acquiring unit 112 transmits the behavior prediction information transmitted from the behavior predicting server 10 to the behavior prediction information display control unit 114.

The behavior prediction information display control unit 114 is to receive the behavior prediction information acquired by the behavior prediction information acquiring unit 112 and execute display control of the behavior prediction information displayed by the display unit 140.

The behavior prediction information display control unit 114 displays the behavior prediction information predicted by the behavior predicting server 10 on the display unit 140 together with the map information. In this case, since the display range of the display unit 140 is limited, the display range of the map information displayed on the display unit 140 is determined by the scale of the map. Therefore, depending on the scale of the map, when the user intends to display, on the display unit 140, the behavior prediction information acquired by the behavior prediction information acquiring unit 112 according to location information, a destination of the behavior prediction information is out of the display range of the display unit 140.

In this case, in the cellular phone 100 according to the embodiment, display on the display unit 140 is controlled such that a present location and a destination are on the same screen in the behavior prediction information display control unit 114.

More specifically, the present location information of the cellular phone 100 acquired by the present location acquiring unit 130 changes, the behavior prediction information acquired by the behavior prediction information acquiring unit 112 also changes with the change of the present location information, and predicted destinations change by the minute. Depending on the change of the destination, display of the behavior prediction information and the map information on the display unit 140 is controlled such that the present location and the destination are on the same screen in the behavior prediction information display control unit 114.

In this manner, when the display of the behavior prediction information and the map information on the display unit 140 is controlled by the behavior prediction information display control unit 114, the cellular phone 100 according to an embodiment of the present invention need not cause the user of the cellular phone 100 to execute an operation of changing the scale of the map with a change of the behavior prediction information. Therefore, the user of the cellular phone 100 only needs to watch the behavior prediction information and the map information displayed on the display unit 140, and can be released from a trouble of executing an operation to change the scale of the map.

The functional configuration of the CPU 110 included in the cellular phone 100 according to an embodiment of the present invention has been described above. A configuration of the behavior predicting server 10 according to an embodiment of the present invention will be described below.

[1-3. Configuration of Behavior Predicting Server]

Figure 4:
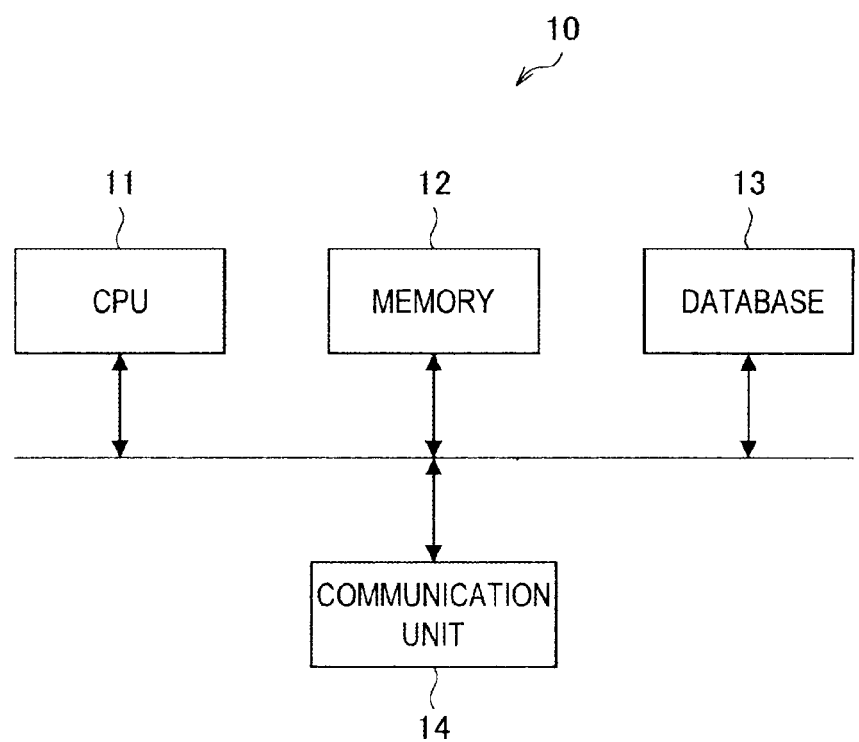
FIG. 4 is an explanatory diagram showing a functional configuration of a behavior predicting server 10 according to an embodiment of the present invention.

FIG. 4 is an explanatory diagram showing a functional configuration of the behavior predicting server 10 according to an embodiment of the present invention. The functional configuration of the behavior predicting server 10 according to an embodiment of the present invention will be described below with reference to FIG. 4.

As shown in FIG. 4, the behavior predicting server 10 according to an embodiment of the present invention includes a CPU 11, a memory 12, a database 13, and a communication unit 14.

The CPU 11 receives information of a present location from the cellular phone 100 through the wireless network 30 connected by the communication unit 14. When the CPU 11 receives the information of the present location from the cellular phone 100, the CPU 11 reads the computer program stored in the memory 12, executes a behavior predicting process of the user of the cellular phone 100 by using the information of the present location of the cellular phone 100 and a history of movement in the past, and generates behavior prediction information.

The memory 12 is to store a computer program and various pieces of information, and may be a storage medium such as a nonvolatile memory or a magnetic disk. As the nonvolatile memory, for example, a flash memory, an EEPROM (Electrically Erasable Programmable Read-Only Memory), and an EPROM (Erasable Programmable ROM) are given. As the magnetic disk, a hard disk, a disk-like magnetic disk, and the like are given.

As described above, as the behavior prediction information, information of movement in the past including a start point, a destination, a route from the start point to the destination, a probability that the user of the cellular phone 100 selects the route, expected time of arrival at the destination is stored in, for example, the database 13. The CPU 11 reads a history of movement of the user of the cellular phone 100 in the past accumulated in, for example, the database 13 to use the history in the behavior predicting process.

The behavior predicting process performed by the CPU 11 can use various techniques, and is not limited to a specific process. For example, the CPU 11 can execute the behavior predicting process of the user of the cellular phone 100 by using the behavior predicting process described in Japanese Patent Application Laid-Open No. 2000-293540 described above.

The behavior predicting process by the CPU 11 may be executed by using not only the present location of the cellular phone 100 and the behavior history but also information of a day of the week and a time zone. The CPU 11 may execute the behavior predicting process by using information of the weather at present or the weather forecast of the day. By using the information of the day of the weak or the time zone and the weather or the weather forecast, the CPU 11 can derive different behavior prediction results depending on the contents of the day of the weak or the time zone and the weather or the weather forecast even though the cellular phone 100 is located at the same position or has a common behavior history.

A result of the behavior predicting process obtained by the CPU 11 is transmitted as behavior prediction information from the communication unit 14 to the cellular phone 100 through the wireless network 30. The cellular phone 100 which receives the behavior prediction information transmitted from the behavior predicting server 10 displays the received behavior prediction information on the display unit 140 to make it possible to show the result of the behavior predicting process obtained by the behavior predicting server 10 to the user.

The functional configuration of the behavior predicting server 10 according to an embodiment of the present invention has been described above with reference to FIG. 4. An operation of a behavior predicting system 1 according to an embodiment of the present invention will be described below.

[1-4. Operation of Behavior Predicting System]

Figure 5:
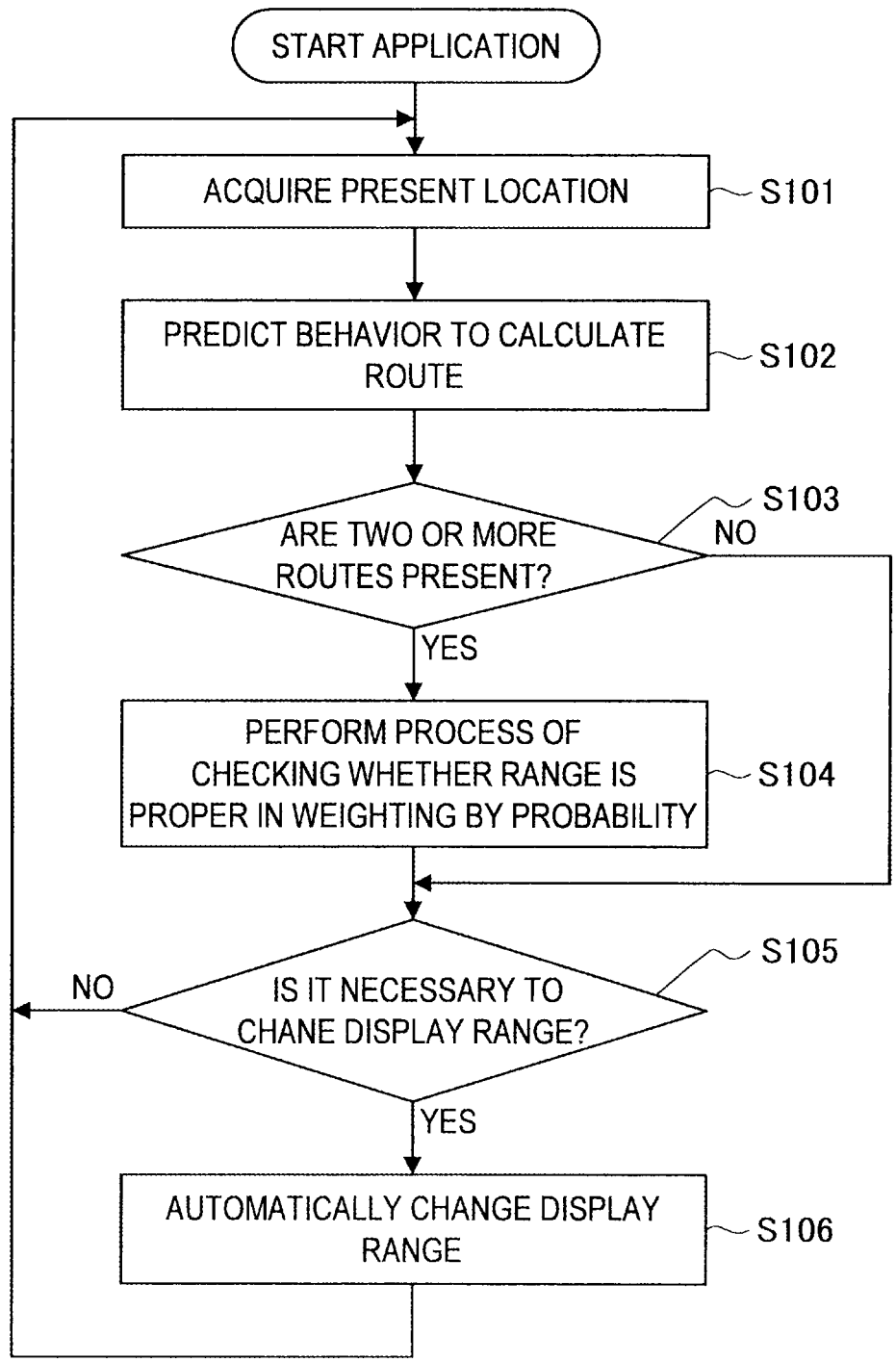
FIG. 5 is a flow chart showing an operation of a behavior predicting system 1 according to an embodiment of the present invention.

FIG. 5 is a flow chart showing an operation of the behavior predicting system 1 according to an embodiment of the present invention. The operation of the behavior predicting system 1 according to an embodiment of the present invention will be described below with reference to FIG. 5.

In order to predict a behavior of a user who holds the cellular phone 100 by using the behavior predicting system 1 according to an embodiment of the present invention, an application to acquire behavior prediction information from the behavior predicting server 10 is activated in the cellular phone 100. The application is also called a "behavior predicting application" hereinafter. When the behavior predicting application is executed in the cellular phone 100, the behavior predicting application acquires a present location of the cellular phone 100 by communication with the GPS satellite 20 performed by using the present location acquiring unit 130 (step S101).

When the present location of the cellular phone 100 is acquired by the present location acquiring unit 130 in step S101, the information of the present location of the cellular phone 100 is sent to the behavior predicting server 10. The behavior predicting server 10 executes the behavior predicting process by using the information of the present location of the cellular phone 100, a history of movement of the cellular phone 100, a behavior history of the user of the cellular phone 100 in the past, and the like to generate behavior prediction information. More specifically, the behavior predicting server 10 executes a process of deriving a present location, a destination, a route from the present location to the destination, expected time of arrival at the destination, and the like (step S102).

The behavior predicting server 10 which executes the behavior predicting process transmits the result of the behavior predicting process as behavior prediction information to the cellular phone 100. In the cellular phone 100, the behavior prediction information acquiring unit 112 acquires the result of the behavior prediction transmitted from the behavior predicting server 10. The behavior prediction information acquired by the behavior prediction information acquiring unit 112 is displayed on the display unit 140 by the behavior prediction information display control unit 114 such that the latitude and the longitude are matched with those of the map information.

Figure 6:
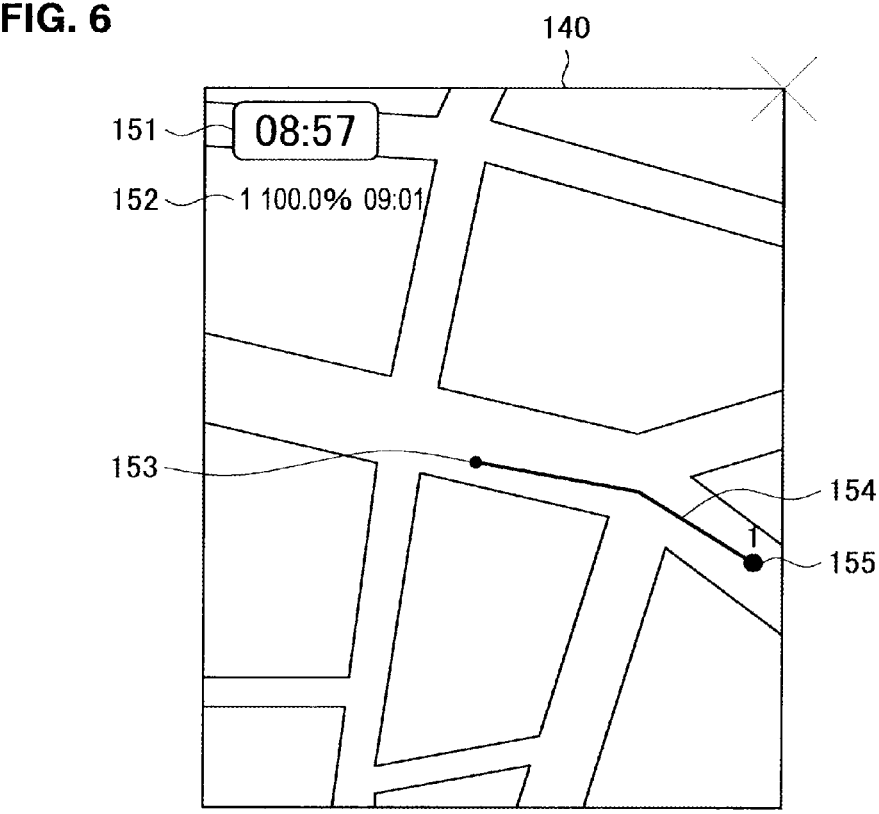
FIG. 6 is an explanatory diagram showing a display of behavior prediction information displayed on a display unit 140 together with map information.

FIG. 6 is an explanatory diagram showing a display of behavior prediction information displayed on the display unit 140 together with the map information. The example shown in FIG. 6 shows a state in which a present time display unit 151, a behavior probability display unit 152, a start point 153, route information 154, and a destination 155 are displayed on the display unit 140 by the behavior prediction information display control unit 114.

The start point 153 is a present location of the cellular phone 100 acquired by the present location acquiring unit 130 at a point of time at which the behavior predicting process is performed in the behavior predicting server 10, and the destination 155 is a destination derived by the behavior predicting process in the behavior predicting server 10. The start point 153 and the destination 155 may be displayed on the display unit 140 by circles having different sizes as shown in, for example, FIG. 6 or may be displayed on the display unit 140 by different figures.

The behavior probability display unit 152 is to display a probability that the user of the cellular phone 100 moves from the start point 153 to the destination 155, the probability being derived by the behavior predicting server 10. On the behavior probability display unit 152, the probability that the user of the cellular phone 100 moves from the start point 153 to the destination 155 and information of expected time of arrival at the destination 155 when the user moves according to the route information 154.

In FIG. 6, only one piece of route information is displayed. A number shown near the destination 155 corresponds to a number shown on the left of the probability displayed on the behavior probability display unit 152. The example shown in FIG. 6 shows that the probability that the user of the cellular phone 100 moves from the start point 153 to the destination 155 is 100%.

As a matter of course, since the user of the cellular phone 100 may move from the start point 153 to a place except for the destination 155, even when all probabilities displayed on the behavior probability display unit 152 are summed up, the total sum is not necessarily 100%.

The route information 154 is to show a route from the start point 153 to the destination 155, the route being derived by the behavior predicting server 10. As shown in FIG. 6, the route information 154 is expressed by a line which connects the start point 153 and the destination 155 to each other.

The center of the display unit 140 is the present location of the cellular phone 100, and the behavior predicting application periodically acquires the present location of the cellular phone 100 by communication with the GPS satellite 20 performed by using the present location acquiring unit 130. Display of the present location of the cellular phone 100 acquired by the present location acquiring unit 130 is controlled by the behavior prediction information display control unit 114 such that the present location is constantly at the center of the display unit 140.

Subsequently, the behavior prediction information acquiring unit 112 checks whether the number of pieces of information of routes from the present location to the destination transmitted from the behavior predicting server 10 is two or more (step S103).

As a result of the determination in step S103, when only one piece of information of a route from the present location to the destination is transmitted from the behavior predicting server 10, the control flow shifts to step S105 (described later) to execute a process that the behavior prediction information display control unit 114 determines whether a route from the present location to the destination needs to change the display range of the display unit 140.

On the other hand, as a result of the determination in step S103, when two or more pieces of information of routes from the present location to the destination are transmitted from the behavior predicting server 10, the behavior prediction information display control unit 114 subsequently performs weighting by behavior probabilities predicted by the behavior predicting server 10 to execute a process of checking whether the display range of the display unit 140 is proper (step S104).

The process in step S104 is concretely performed by the following process. The behavior prediction information display control unit 114 checks whether a route between the present location and the destination is out of a displayable range of the display unit 140. The displayable range of the display unit 140 is designated by a magnification of, for example, the map information, and a plurality of levels are discretely given to the value of the magnification. When the route between the present location and the destination is out of the displayable range of the display unit 140, the number of levels at which the map information on the display unit 140 is necessary to be reduced is requested. The number of levels of reduction is defined as a negative number of differences.

On the other hand, when the route between the present location and the destination is not out of the displayable range of the display unit 140, it is checked whether the route between the present location and the destination is out of the displayable range of the display unit 140 even though the map information on the display unit 140 is enlarged at any number of levels. The number of levels of magnification is defined as a positive number of differences.

The behavior prediction information display control unit 114 adds the numbers of differences calculated in units of routes such that behavior probabilities of the routes are weighted, and checks whether the display range of the display unit 140 is proper depending on whether the added value exceeds a predetermined threshold. In this manner, the weighting is performed by the behavior probabilities of the routes to prevent the determining process of the properness of the display range of the display unit 140 from being influenced by the number of differences having a low behavior probability. When the display range of the display unit 140 is considerably changed at a time, the user may be confused. The display range can be gradually changed in units of the magnifications which are discretely given as described above.

In step S104, when the behavior prediction information display control unit 114 executes the process of checking whether the display range of the display unit 140 is proper, the behavior prediction information display control unit 114 subsequently determines whether the display range of the display unit 140 is necessary to be changed by the process in step S104 (step S105).

As a result of the determination in step S105, when the display range of the display unit 140 is not necessary to be changed, the control flow returns to step S101 to execute the process of acquiring the present location of the cellular phone 100 by communication with the GPS satellite 20 performed by using the present location acquiring unit 130.

On the other hand, as a result of the determination in step S105, when the display range of the display unit 140 is necessary to be changed, the behavior prediction information display control unit 114 properly sets the display range of the display unit 140 (step S106). After the behavior prediction information display control unit 114 properly sets the display range of the display unit 140, the control flow returns to step S101 to execute the process of acquiring the present location of the cellular phone 100 by communication with the GPS satellite 20 performed by using the present location acquiring unit 130.

Figure 7:
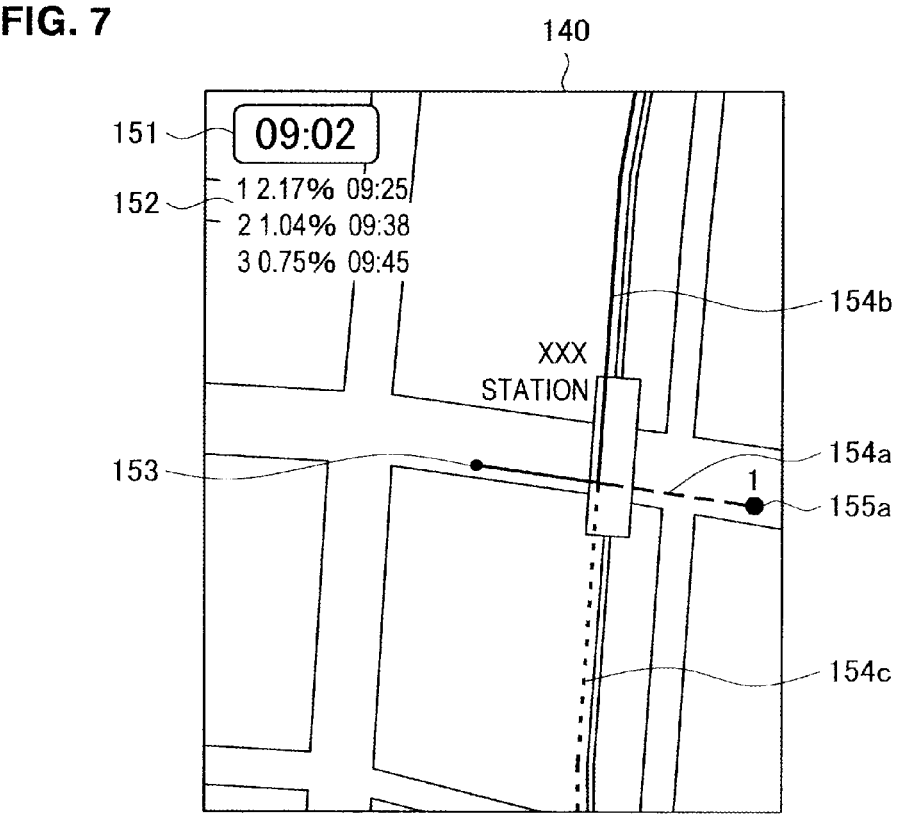
FIG. 7 is an explanatory diagram showing a display of behavior prediction information displayed on the display unit 140 together with map information.

FIG. 7 is an explanatory diagram showing a display of behavior prediction information displayed on the display unit 140 together with the map information. The example shown in FIG. 7 shows a state in which three routes are derived by the behavior predicting process by the behavior predicting server 10 and displayed on the display unit 140.

In FIG. 7, although route information 154a from the start point 153 to a destination 155a is displayed on the display unit 140, destinations of pieces of route information 154b and 155c are out of the display range of the display unit 140, and the pieces of route information 154b and 155c are not completely displayed on the display unit 140.

Therefore, the behavior prediction information display control unit 114 executes the process of checking whether the display range of the display unit 140 is proper, and determines whether the pieces of route information 154b and 155c should be completely displayed on the display unit 140. As a result of the determination, when the pieces of route information 154b and 155c should be completely displayed on the display unit 140, the behavior prediction information display control unit 114 reduces a display magnification of the map information and performs control such that the pieces of route information 154b and 155c are completely displayed on the display unit 140.

Figure 8:
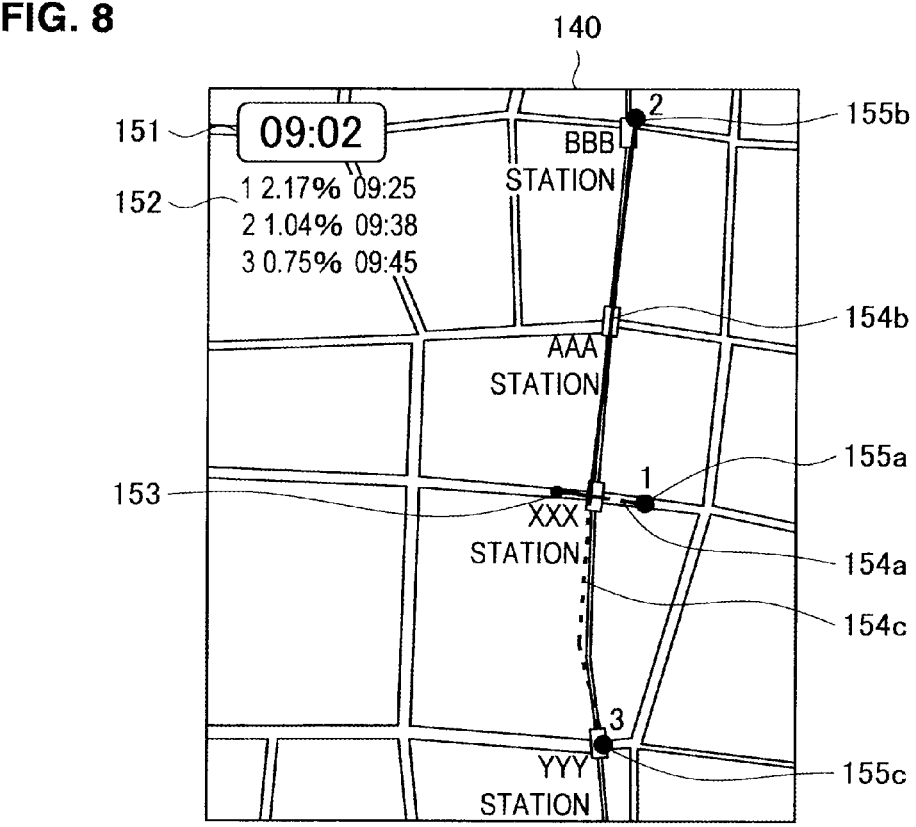
FIG. 8 is an explanatory diagram showing a display of behavior prediction information displayed on the display unit 140 together with map information.

FIG. 8 is an explanatory diagram showing a display of the behavior prediction information displayed on the display unit 140 together with the map information. The example shown in FIG. 8 shows a state in which the behavior prediction information display control unit 114 reduces the display magnification of the map information to enlarge the display range of the display unit 140 in the state shown in FIG. 7.

In FIG. 8, in addition to the destination 155a, destinations 155b and 155c are displayed on the display unit 140. In this manner, when the display range of the display unit 140 is automatically changed by the behavior prediction information display control unit 114, a user can check the behavior prediction information by only watching the information displayed on the display unit 140.

When the position of the cellular phone 100 changes, a behavior prediction result obtained by the behavior predicting server 10 changes with the change of the position of the cellular phone 100. In this case, the information displayed on the display unit 140 also changes. The behavior prediction information display control unit 114 automatically changes the display range of the display unit 140 with the change of the behavior prediction result obtained by the behavior predicting server 10.

Figure 9:
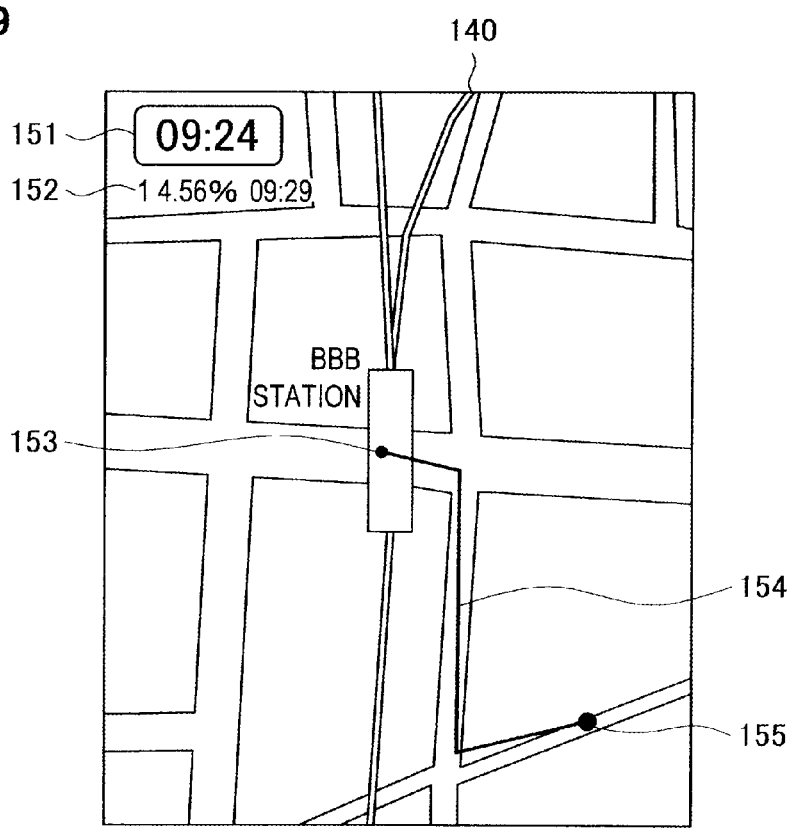
FIG. 9 is an explanatory diagram showing a display of behavior prediction information displayed on the display unit 140 together with map information.

FIG. 9 is an explanatory diagram showing a display of the behavior prediction information displayed on the display unit 140 together with the map information. The example shown in FIG. 9 shows a state in which a result of behavior prediction by the behavior predicting server 10 is displayed on the display unit 140 when a user of the cellular phone 100 moves to "BBB station" by train.

In the example shown in FIG. 9, one piece of route information 154 is illustrated by the behavior predicting process by the behavior predicting server 10, and a route from the start point 153 to the destination 155 is displayed on the display unit 140. In the example shown in FIG. 9, in comparison with the example shown in FIG. 8, the map information is enlarged and displayed on the display unit 140.

In this manner, when the display range of the display unit 140 is automatically changed by the behavior prediction information display control unit 114 with the change of the route information, a user can check the behavior prediction information by only watching the information displayed on the display unit 140.

An operation of the behavior predicting system 1 according to an embodiment of the present invention will be described below with reference to FIG. 5. In this embodiment, although weighting is performed by behavior probabilities derived by the behavior predicting server 10, it may be determined whether a route is properly displayed on the display unit 140 without executing the weighting by the behavior probabilities derived by the behavior predicting server 10 as a matter of course. When the behavior probability derived by the behavior predicting server 10 is lower than a predetermined threshold value, the behavior prediction information display control unit 114 may cause the route not to be subjected to display control of the display unit 140. A modification of the cellular phone 100 according to an embodiment of the present invention will be described below.

[1-5. Modification]

In the behavior predicting system 1 according to an embodiment of the present invention, the cellular phone 100 sequentially transmits pieces of information of present locations to the behavior predicting server 10, and a behavior prediction result obtained by the behavior predicting server 10 is received by the cellular phone 100. However, the present invention is not limited to the example. For example, the behavior predicting process may also be executed by the cellular phone 100, only map information may be acquired from an external server through the wireless network 30, and behavior prediction result may be displayed on the display unit 140 together with the map information.

Figure 10:
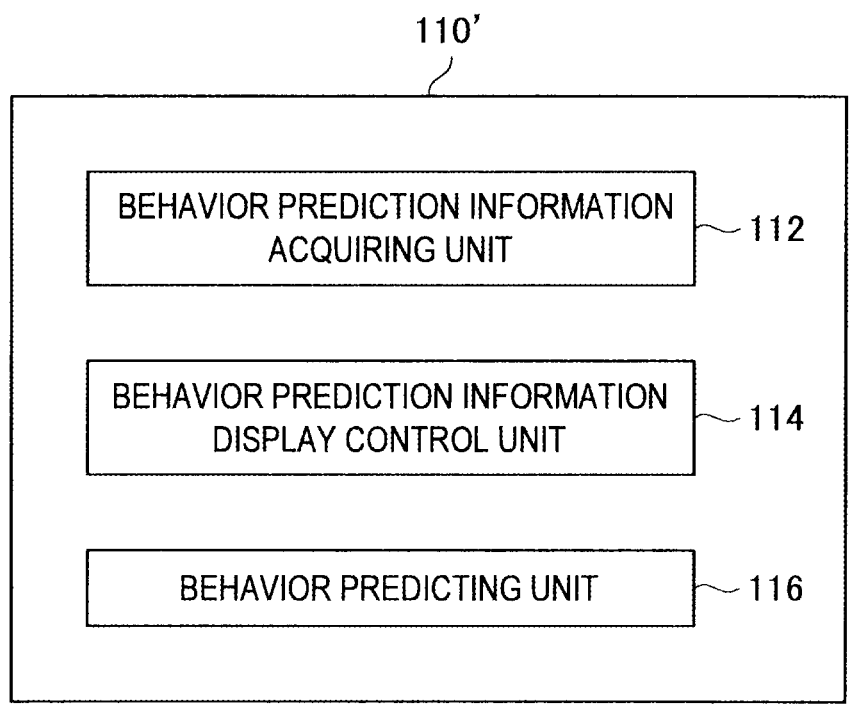
FIG. 10 is an explanatory diagram showing a functional configuration of a CPU 110', which is a modification of the CPU 110 included in the cellular phone 100 according to an embodiment of the present invention.

FIG. 10 is an explanatory diagram of a functional configuration of a CPU 110' serving as a modification of the CPU 110 included in the cellular phone 100 according to an embodiment of the present invention. As shown in FIG. 10, the CPU 110' serving as the modification of the CPU 110 is configured to function as a behavior prediction information acquiring unit 112, a behavior prediction information display control unit 114, and a behavior predicting unit 116 by reading and executing a computer program stored in the memory 120.

The behavior predicting unit 116 is to execute the same process as the behavior predicting process executed by the behavior predicting server 10. The behavior prediction information obtained by the behavior predicting unit 116 is acquired by the behavior prediction information acquiring unit 112 and sent to the behavior prediction information display control unit 114. The process executed by the behavior prediction information display control unit 114 is not different from the process described above.

In this manner, even though the behavior predicting process is executed by the cellular phone 100, a display range of behavior prediction information displayed on the display unit 140 can be automatically changed depending on a change of behavior prediction information by the same manner as described above.

2. Conclusion

As described above, according to an embodiment of the present invention, each time the cellular phone 100 acquires behavior prediction information from the behavior predicting server 10, the behavior prediction information display control unit 114 controls display of the behavior prediction information on the display unit 140.

More specifically, when route information acquired from the behavior predicting server 10 is out of a displayable range of the display unit 140, the behavior prediction information display control unit 114 reduces a scale of a map to execute control such that the route information falls within the displayable range of the display unit 140. In contrast to this, when the route information falls within the displayable range of the display unit 140 even though the scale of the map is increased, the behavior prediction information display control unit 114 increases the scale of the map to an upper limit at which the route information falls within the displayable range of the display unit 140.

In this manner, by controlling the display on the display unit 140, even though a route between a start point and a destination obtained by behavior prediction is out of the displayable range of the display unit 140, displays of the display unit 140 are automatically switched such that the route between the start point and the destination is not out of the displayable range. For this reason, a user of the cellular phone 100 does not need to perform an operation to switch scales of the map, and the convenience is enhanced.

Since the display on the display unit 140 is automatically controlled, the cellular phone 100 according to an embodiment of the present invention can read information related to map information and behavior prediction information prior to the display process on the display unit 140. Since interruption by a user operation can be avoided in acquisition and display of the behavior prediction information, the cellular phone 100 according to an embodiment of the present invention can realize stable screen transition.

It should be understood by those skilled in the art that various modifications, combinations, sub-combinations and alterations may occur depending on design requirements and other factors insofar as they are within the scope of the appended claims or the equivalents thereof.

For example, in the embodiment, the device which displays behavior prediction information is explained as the cellular phone 100. However, the present invention is not limited to the example. The behavior prediction information may be displayed by using a mobile terminal which can acquire a present location from a satellite or the like and display behavior prediction information, for example, a PDA (Personal Digital Assistant), a mobile game machine, a mobile music player, a mobile video player, or the like.

What is claimed is:

1. A method of displaying predicted information of a user, comprising:
    using at least one processor:
        sending a first location of the user to at least one server;
        receiving, from the at least one server, first predicted information of the user, the first predicted information comprising a first predicted destination, a probability that the user will select the first predicted destination and an expected time of arrival at the first predicted destination;
        generating display information of a map, the display information having, within a display range, the first predicted destination, the probability that the user will select the first predicted destination and the expected time of arrival at the first predicted destination;
        sending a second location of the user to the at least one server;
        receiving, from the at least one server, second predicted information, the second predicted information comprising a second predicted destination different from the first predicted destination, a probability that the user will select the second predicted destination, and an expected time of arrival at the second predicted destination, wherein the second predicted destination is determined based at least in part on historical information regarding the user and the second location of the user;
        determining that the second predicted destination is not within the display range of the map; and
        automatically changing the display range of the map based on said determining step such that the first predicted destination and the second predicted destination are both within the display range of the map.

2. The method of claim 1, wherein the first predicted destination is based at least in part on historical information regarding the user.

3. The method of claim 1, further comprising:
    displaying, using a display unit, the map and the second predicted destination within the display range.

4. The method of claim 1, wherein the server determines that a change in predicted behavior of the user has occurred based on the second location of the user.

5. The method of claim 1, wherein the server determines that a change in predicted behavior of the user has occurred based on the first location of the user.

6. The method of claim 1, wherein the map, the first predicted destination and the second predicted destination are displayed using a mobile device.

7. The method of claim 1, wherein the second predicted information is received from the at least one server, which generates the second predicted information when a change in predicted behavior of the user has occurred.

8. The method of claim 1, further comprising acquiring the first location of the user from a satellite.

9. The method of claim 1, wherein the second predicted information comprises a route from the second location of the user to the second predicted destination.

10. The method of claim 1, wherein the second predicted information comprises a plurality of predicted routes of the user.

11. The method of claim 10, wherein the step of determining is performed based at least partially on calculated probabilities that individual routes of the plurality of predicted routes will be taken by the user.

12. The method of claim 11, wherein the step of determining is performed by weighting differences in levels of magnification associated with the display range and the routes according to the calculated probabilities to obtain a weighted value, and determining whether the weighted value exceeds a threshold.

13. A device, comprising:
    at least one processor configured to:
        send a first location of a user to at least one server;
        receive, from the at least one server, first predicted information of the user, the first predicted information comprising a first predicted destination, a probability that the user will select the first predicted destination and an expected time of arrival at the first predicted destination;
        control a display unit to display a map, the display unit having, within a display range, the first predicted destination, the probability that the user will select the first predicted destination and the expected time of arrival at the first predicted destination;
        send a second location of the user to the at least one server;
        receive, from the at least one server, at least one second predicted destination different from the first predicted destination and having been determined based at least in part on historical information regarding the user and the second location of the user; and
        determine whether the at least one second predicted destination is within the display range of the map, and, if the at least one second predicted destination is not within the display range of the map, automatically change the display range of the map, based on the at least one second predicted destination and based on the determination that the at least one second predicted destination is not within the display range of the map, such that the at least one second predicted destination and the first predicted destination are within the display range of the map.

14. The device of claim 13, further comprising a location acquiring unit that determines the first location of the user.

15. The device of claim 14, wherein receiving, from the at least one server, at least one second predicted destination additionally comprises receiving, from the at least one server, at least one second predicted route, wherein each of the at least one second predicted routes comprises a route from the second location of the user to a respective second predicted destination.

16. The device of claim 15, wherein the determination as to whether the at least one second predicted destination is within a display range of the map is performed at least partially based upon calculated probabilities that individual routes of the at least one second predicted routes will be taken by the user.

17. The device of claim 16, wherein the determination as to whether the at least one second predicted destination is within a display range of the map is performed by weighting differences in levels of magnification associated with the display range and the routes according to the calculated probabilities to obtain a weighted value, and determining whether the weighted value exceeds a threshold.

18. The device of claim 13, wherein the at least one second predicted destination comprises a plurality of predicted destinations.

19. A method of generating and displaying predicted information of a user, the method comprising:
using at least one processor:
receiving, from at least one server, first predicted information of the user, the first predicted information comprising a first predicted destination, a probability that the user will select the first predicted destination and an expected time of arrival at the first predicted destination;
generating display information of a map, the display information having, within a display range, the first predicted destination, the probability that the user will select the first predicted destination and the expected time of arrival at the first predicted destination;
generating second predicted information of the user based on a change in the user's behavior and based at least in part on historical information regarding the user, the second predicted information comprising a second predicted destination different from the first predicted destination, a probability that the user will select the second predicted destination, and an expected time of arrival at the second predicted destination;
determining that the second predicted destination is not within the display range of the map; and
automatically changing the display range of the map, based on the second predicted information and based on the determination that the second predicted information is not within the display range of the map, such that the first predicted destination and the second predicted destination are both within the display range of the map.

20. The method of claim 19, wherein the display information is displayed using a mobile device, and the method further comprises:
determining a location of the user;
sending the location of the user from the mobile device to at least one server; and
receiving the second predicted information from the at least one server to the mobile device,
wherein the step of generating the second predicted information is performed based on the determined location.

21. The method of claim 20, wherein the location of the user is sent using a wireless network, and the second predicted information is received using the wireless network.

22. A non-transitory computer readable storage medium having stored thereon instructions, which, when executed, perform a method of displaying predicted information of a user, the method comprising:
receiving, from at least one server, first predicted information of the user, the first predicted information comprising a first predicted destination, a probability that the user will select the first predicted destination, and an expected time of arrival at the first predicted destination;
generating display information of a map, the display information having, within a display range, the first predicted destination, the probability that the user will select the first predicted destination and the expected time of arrival at the first predicted destination;
receiving, from the at least one server, at least one second predicted destination, the at least one second predicted destination having been determined based at least in part on historical information regarding the user, and being different from the first predicted destination;
determining that the at least one second predicted destination is not within the display range of the map; and
automatically changing the display range of the map, based on the second predicted destination and based on the determination that the second predicted destination is not within the display range of the map, such that the first predicted destination and the at least one second predicted destination are within the display range of the map.

23. The non-transitory computer readable storage medium of claim 22, wherein the method further comprises:
displaying, using a display unit, the map and the at least one second predicted destination within the display range.

24. The non-transitory computer readable storage medium of claim 22, wherein the step of determining reflects whether a change in predicted behavior of the user has occurred.

25. The non-transitory computer readable storage medium of claim 22, wherein receiving the first predicted information of the user is based on a change in predicted behavior of the user.

26. The non-transitory computer readable storage medium of claim 22, wherein the map, the first predicted destination, and the at least one second predicted destination are displayed using a mobile device.

27. The non-transitory computer readable storage medium of claim 22, wherein the server generates the at least one second predicted destination when a change in predicted behavior of the user has occurred.

28. The non-transitory computer readable storage medium of claim 22, wherein the method further comprises determining a location of the user.

29. The non-transitory computer readable storage medium of claim 28, wherein the method further comprises sending the location of the user to the at least one server.

30. The non-transitory computer readable storage medium of claim 22, wherein the at least one second predicted destination comprises a plurality of predicted destinations of the user.

31. The non-transitory computer readable storage medium of claim 30, wherein said receiving, from the at least one server, at least one second predicted destination additionally comprises receiving, from the at least one server, at least one second predicted route, and wherein the step of determining is performed based at least partially on calculated probabilities that individual routes of the at least one second predicted routes will be taken by the user.

32. The non-transitory computer readable storage medium of claim 31, wherein the step of determining is performed by weighting differences in levels of magnification associated with the display range and the routes according to the calculated probabilities to obtain a weighted value, and determining whether the weighted value exceeds a threshold.

* * * * *